US007688755B2

(12) United States Patent
Xiao et al.

(10) Patent No.: US 7,688,755 B2
(45) Date of Patent: Mar. 30, 2010

(54) METHOD AND APPARATUS FOR GROUP LEADER SELECTION IN WIRELESS MULTICAST SERVICE

(75) Inventors: Xin Xiao, Elk Grove Village, IL (US); Tomas Capurka, Palatine, IL (US); Christopher Cushing, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 1028 days.

(21) Appl. No.: 11/257,600

(22) Filed: Oct. 25, 2005

(65) Prior Publication Data
US 2007/0091889 A1 Apr. 26, 2007

(51) Int. Cl.
*H04L 12/28* (2006.01)
*H04B 7/00* (2006.01)
(52) U.S. Cl. ...................... 370/254; 455/519
(58) Field of Classification Search ............... 370/390, 370/392, 395.42, 400, 401, 432, 471, 475, 370/331, 332, 333, 334, 338; 709/220, 221, 709/222; 713/163
See application file for complete search history.

(56) References Cited

U.S. PATENT DOCUMENTS

| 5,831,975 | A | 11/1998 | Chen et al. | |
|---|---|---|---|---|
| 5,881,368 | A | 3/1999 | Grob et al. | |
| 6,718,361 | B1 | 4/2004 | Basani et al. | |
| 6,993,587 | B1 * | 1/2006 | Basani et al. | 709/229 |
| 2002/0082035 | A1 * | 6/2002 | Aihara et al. | 455/518 |
| 2004/0229624 | A1 * | 11/2004 | Cai et al. | 455/449 |
| 2005/0232177 | A1 * | 10/2005 | Herrmann | 370/315 |
| 2006/0172756 | A1 * | 8/2006 | Sharony | 455/519 |
| 2008/0031179 | A1 * | 2/2008 | Gao et al. | 370/312 |

OTHER PUBLICATIONS

Suming Chang, H. Jonathan Chao and Xiaolei Guo, TCP-Friendly Window Congestion Control with Dynamic Grouping for Reliable Multicast, 2000, IEEE, p. 541.*
Multicast Forwarding Overview, Jan. 21, 2005, Microsoft Corporation, p. 1.*
Yih Huang and Philip K. McKinley, Group Leader Election under Link-State Routing, 1997, Michigan State University Department of Computer Science, pp. 4-5.*
Motorola iDEN , RF Sub-System, iDEN RF Interface Radio Link Control, 68P81127E91-F, May 12, 2004, pp. 1-55.

* cited by examiner

*Primary Examiner*—Gregory B Sefcheck
*Assistant Examiner*—Ashley L Shivers

(57) ABSTRACT

In a telecommunication system comprising a multicast group (110) and a base station (200), a signal performance value (304) is received from at least two members of the multicast group (110) to generate a set of signal performance values (306). A group leader (310) of the multicast group (110) is selected as a function of the set of signal performance values (306) to acknowledge multicast transmissions from the base station (200) to the multicast group (110).

22 Claims, 17 Drawing Sheets

500

```
MinSEQ = 0
Leader = 0

If the leader left
{
        Send the SQE (signal quality estimation) polling message to all
group members
}

Start a leader_election_timer

While leader_election_timer is running
{
        receive the SQE information(MobileSQE) from a group member,
Mobile(i)

if (MinSQE == 0) or (MinSQE > MobileSQE)
                {
                        MinSQE = MobileSQE
                        Leader = Mobile(i)
                }
}
return Leader
```

```
MaxMissedPercentage = 0
Leader = 0

If the leader left
{
        Send the Leadership polling message to all group members
}

Start a leader_election_timer

While leader_election_timer is running
{
        receive the Missed Packet Percentage from a group member,
Mobile(i)

if MaxMissedPercentage < MobileMissedPacketPercentage
        {
                MaxMissedPercentage = MobileMissedPacketPercentage
                Leader = Mobile(i)
        }
} return Leader
```

*FIG. 16*

METHOD AND APPARATUS FOR GROUP LEADER SELECTION IN WIRELESS MULTICAST SERVICE

FIELD OF THE INVENTION

The present invention relates generally to wireless telecommunication systems. More specifically, but without limitation thereto, the present invention relates to a method and apparatus for selecting a group leader of a multicast group to acknowledge multicast transmissions from a base station to the multicast group.

BACKGROUND OF THE INVENTION

Recently, there has been an increasing demand for applications that require multicast service. Multicast service provides transmission of a message from a base station to multiple members of a multicast group concurrently, in contrast to unicast service, in which a message is transmitted from the base station to a single user. Applications that require multicast service include group-oriented mobile commerce, military command and control, first-response team communications, education over wireless, and intelligent transportation management systems. With the increasing popularity of mobile handsets, it has become highly desirable to extend multicast service to the wireless environment. Several wireless technologies now support multicast service using a common multicast channel, for example, wideband code division multiple access, (W-CDMA), CDMA2000, and the IEEE 802.11 standard for wireless local area networks (WLANs).

DESCRIPTION OF THE SEVERAL VIEWS OF THE DRAWINGS

The following drawings are presented by way of example and not limitation, wherein like references indicate similar elements throughout the several views of the drawings, and wherein:

FIG. 5 illustrates a computer program for the flow chart of FIG. 3 that includes a group leader selection timer;

FIG. 16 illustrates a computer program for the method of FIG. 3 for selecting the group leader when the signal performance value is based on the missed packet percentage experienced by each group member.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that may be useful or necessary in a commercially feasible embodiment are often not depicted in order to facilitate a less obstructed view of the illustrated embodiments.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific order; however, practitioners of the art will understand that the specific order depicted is not a requirement. Also, the terms and expressions used in the description have the ordinary meanings accorded to such terms and expressions in the corresponding respective areas of inquiry and study except where other meanings have been specifically set forth herein.

Pursuant to the following teachings, a signal performance value is received from at least two members of a multicast group to generate a set of signal performance values. A group leader of the multicast group is selected as a function of the set of signal performance values to acknowledge multicast transmissions from the base station to the multicast group.

Prior to describing various embodiments for selecting a group leader of the multicast group as a function of the set of signal performance values, certain relevant aspects of previous telecommunication systems are briefly described.

Figure 1:
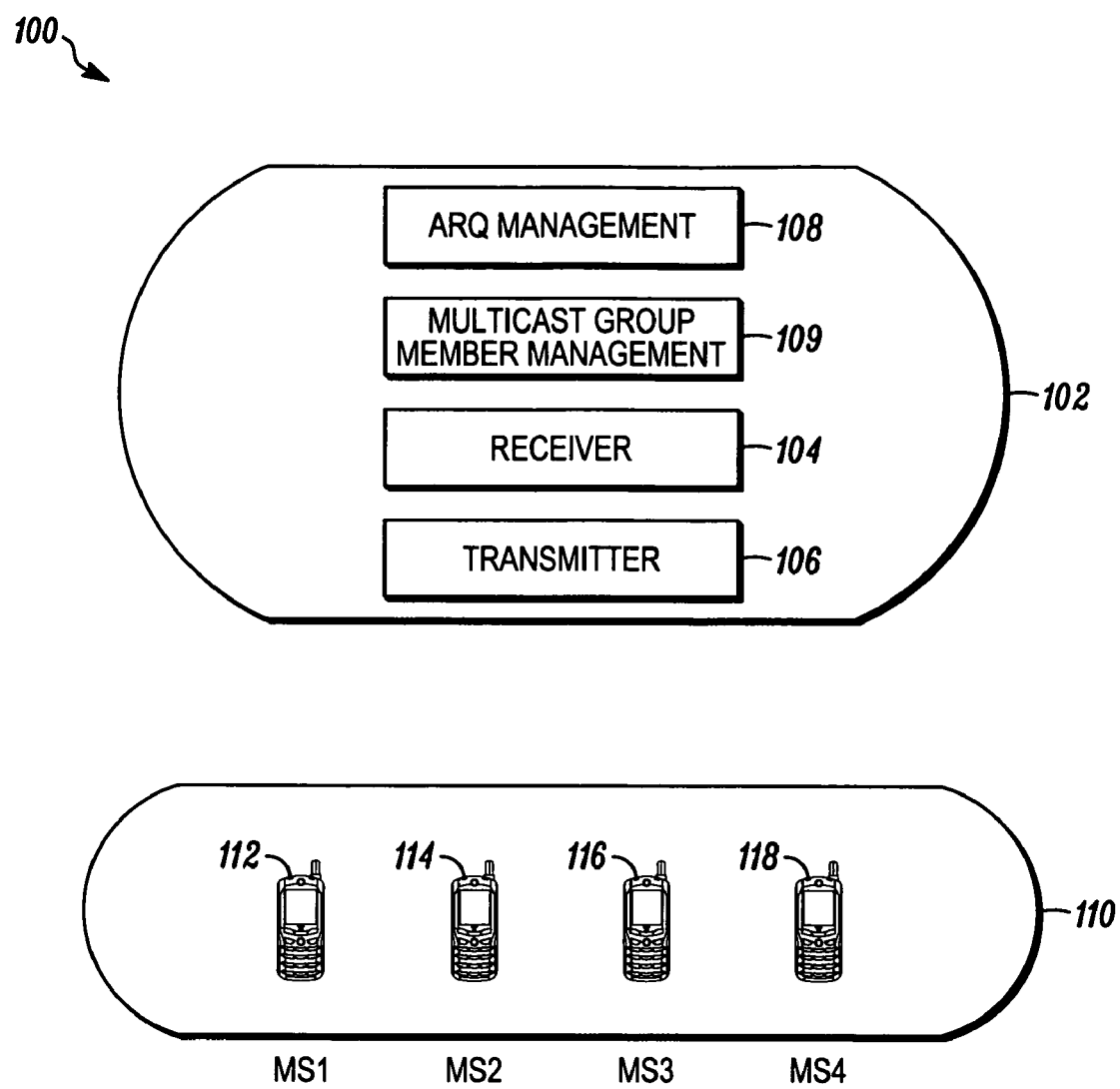
FIG. 1 illustrates a diagram of a portion of a typical telecommunication system of the prior art.

FIG. 1 illustrates a diagram of a portion of a typical telecommunication system 100 of the prior art. Shown in FIG. 1 are a base station 102, a receiver 104, a transmitter 106, an automatic repeat request (ARQ) management module 108, a multicast group member management module 109, a multicast group 110, and mobile stations 112, 114, 116, and 118.

In FIG. 1, each of the mobile stations 112, 114, 116, and 118 may be, for example, a mobile handset, a desktop computer, or any communication device used to send and/or receive messages in the telecommunication system 100 that is compatible with multicast service. The mobile stations 112, 114, 116, and 118 are members of the multicast group 110. In general, the multicast group 110 may include any number of two or more mobile stations. The base station 102 typically includes the receiver 104, a transmitter 106, and the automatic repeat request management module 108.

The receiver 104 receives messages or datagrams from each of the mobile stations 112, 114, 116, and 118. The transmitter 106 transmits messages or datagrams to each of the mobile stations 112, 114, 116, and 118 individually during unicast service and to all of the mobile stations 112, 114, 116, and 118 in the multicast group 110 concurrently during multicast service. The automatic repeat request function 108 controls the repeated transmission of messages or datagrams that are not successfully received by all of the mobile stations 112, 114, 116, and 118 during multicast service.

Because wireless link error rates may be high, recovery from wireless link errors using only the transport layer protocols becomes extremely inefficient. Reliable link access protocol or high probability delivery protocol is preferably used between the base station 102 and each of the mobile stations 112, 114, 116, and 118 for local error recovery to increase throughput, to reduce message delay, and to minimize bandwidth consumption. Because each of the mobile stations 112, 114, 116, and 118 in the multicast group 110 receives multicast messages from the base station 102 concurrently, the base station 102 selects one member of the multicast group 110 as the group leader to acknowledge multicast messages or datagrams from the base station 102. The acknowledge message from the group leader informs the base station 102 whether each multicast message or datagram is successfully received.

The multicast group member management module 109 keeps track of the members that constitute the multicast group 110. For example, if a member leaves the group, then the multicast group member management module 109 can forward missed datagrams to the former member's new address. Also, if a new member joins the multicast group 110, then the multicast group member management module 109 adds the new member to the number of members in the group.

Typically, the base station 102 selects the first registered member of the multicast group 110 as the group leader. While this approach is generally satisfactory for protocols that work in the same manner regardless of the choice of group leader, selecting the first registered member as the group leader may not provide the best performance for protocols that require the automatic repeat request (ARQ) function from a single end point. The group leader selected by the base station 102 in this way may not accurately represent the reception of the messages or datagrams by all of the members of the multicast group 110. For example, the base station 102 may select the mobile station 112 as the group leader, and the mobile stations 114, 116, and 118 may have poorer reception than the group leader. Because the group leader has the best signal performance in the multicast group 110, the group leader will report the successful reception of multicast messages or datagrams from the base station 102 that may not have been received by the mobile stations 114, 116, and 118. As a result, overall performance of the multicast service provided to the multicast group 110 may be degraded if only the signal performance for the mobile station 112 having the best signal performance is considered. Accordingly, it is desirable to select a group leader for the multicast group 110 that more accurately represents the signal performance of all the members of the multicast group.

In one embodiment, a base station for a telecommunication system includes:

a set of signal performance values generated from a signal performance value received from each of at least two members of a multicast group; and a group leader selection management module for selecting a group leader of the multicast group as a function of the set of signal performance values to acknowledge multicast transmissions from the base station to the multicast group.

Figure 2:
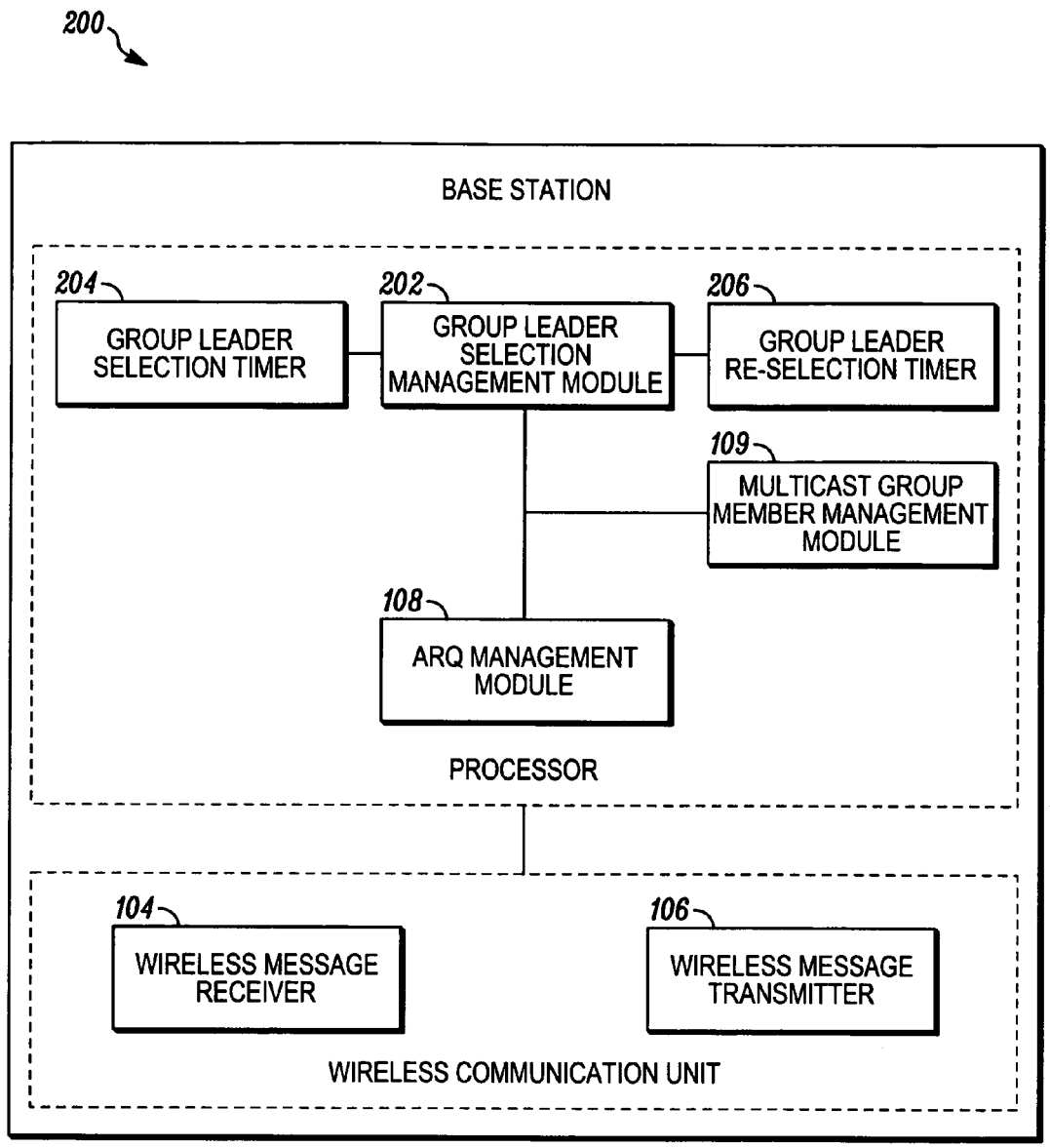
FIG. 2 illustrates a diagram of a base station for the telecommunication system of FIG. 1 including a group leader selection module.

FIG. 2 illustrates a diagram of a base station 200 for the telecommunication system of FIG. 1 that includes a group leader selection module. Shown in FIG. 2 are a receiver 104, a transmitter 106, an automatic repeat request management module 108, multicast group member management module 109, a group leader selection management module 202, a group leader selection timer 204, and a group leader re-selection timer 206.

In FIG. 2, the group leader selection management module 202 is advantageously included in the arrangement of the base station 102 described above for FIG. 1. The group leader selection management module 202 selects a group leader for the multicast group 110 as a function of the quality of reception of messages or datagrams from the base station 200 experienced by all of the mobile stations 112, 114, 116, and 118 in the multicast group 110. The quantified quality of reception of messages or datagrams from the base station 200 by a member of the multicast group 110 is referred to herein as a signal performance value. For example, the group leader may be selected as the member that has the worst signal performance value in the multicast group 110. Because the group leader requests the base station 200 to re-transmit each message or datagram that the group leader did not successfully receive, the members of the multicast group 10 that have higher signal performance valiues than the group leader are more likely to receive any messages or datagrams that they may have dropped. Signal performance values may be calculated according to well-known techniques from various parameters, including but not limited to the signal quality estimate (SQE), the received signal strength indicator (RSSI), and the received outbound power (Pro) and the missed packet percentage for each member of the multicast group 110 to generate a set of signal performance values. For purposes of illustration, the signal quality estimate (SQE) is used in the following examples as the signal performance value. The group leader selection management module 202 may implement a suitable function of the set of signal performance values to select the group leader as illustrated by the following examples.

Figure 3:
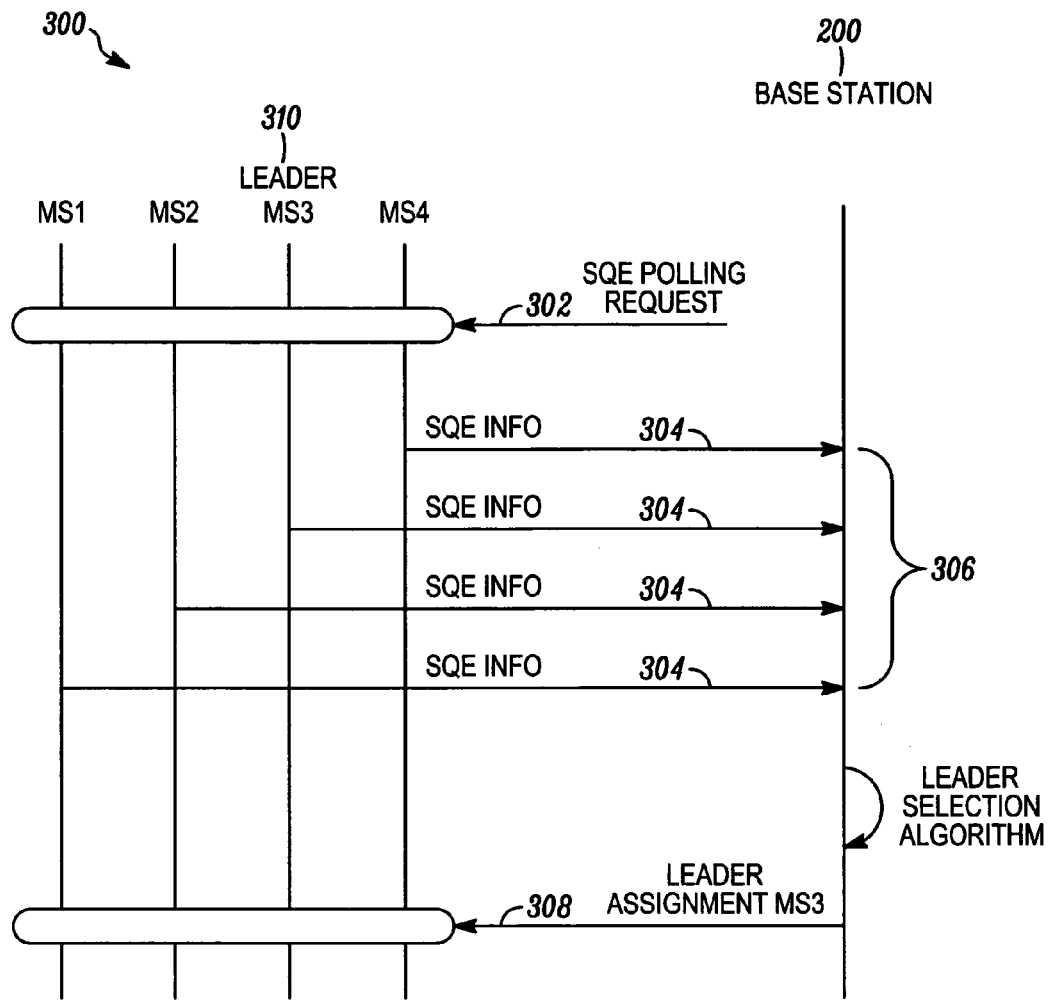
FIG. 3 illustrates a functional diagram of the group leader selection module of FIG. 2 in which the base station polls each member of the multicast group for a signal quality estimate.

FIG. 3 illustrates a functional diagram 300 of the group leader selection module of FIG. 2 in which the base station 200 polls each member of the multicast group for a signal quality estimate. Shown in FIG. 3 are a polling request 302, signal quality estimate information messages 304, a set of signal quality estimates 306, a group leader assignment message 308, and a group leader 310.

In FIG. 3, the group leader selection management module 202 in the base station 200 transmits the polling request 302 to the mobile stations 112, 114, 116, and 118 in the multicast group 110. In response to the polling request 302, each of the mobile stations 112, 114, 116, and 118 transmits a signal quality estimate (SQE) information message 304. The signal quality estimate (SQE) is defined in standard wireless service protocols as a value, typically expressed in decibels, that is generated by each of the mobile stations 112, 114, 116, and 118 to indicate the signal performance in real time. For example, a signal quality estimate of 0 dB may indicate perfect signal performance.

The group leader selection management module 202 receives the signal quality estimate messages 304 received from each of the mobile stations 112, 114, 116, and 118 and generates the set of signal performance values 306. In this example, the set of signal performance values 306 is generated from the signal quality estimates (SQE) 304. In general, the set of signal performance values 306 may include other parameters, such as the received signal strength indicator (RSSI), the received outbound power (Pro), and the missed packet percentage. The group leader selection management module 202 selects the group leader 310 of the multicast group 110 as a function of the set of signal performance values 306, for example, the mobile station (MS) 112, 114, 116, or 118 that has the worst signal performance. Alternatively, the group leader selection management module 202 may select the group leader from the multicast group 110 that has an intermediate signal performance value between the lowest and the highest, for example, to avoid an excessive number of re-transmissions that are not needed by most members of the multicast group 110.

The group leader selection management module 202 notifies each of the mobile stations 112, 114, 116, and 118 of the selection of the group leader 310 via the group leader assignment message 308 so that only the group leader 310 acknowledges and requests re-transmission of multicast messages from the base station 200. Alternatively, the group leader selection management module 202 may transmit a message to each member of the multicast group except the group leader 310 to suspend acknowledgment of subsequent multicast messages. From then on, only the group leader 310 will respond to multicast messages on behalf of the multicast group 110. Unicast messages, that is, messages or datagrams sent from the base station 200 to any single mobile station that is also a member of the multicast group 110, may continue to be acknowledged by the mobile station as before.

Figure 4:
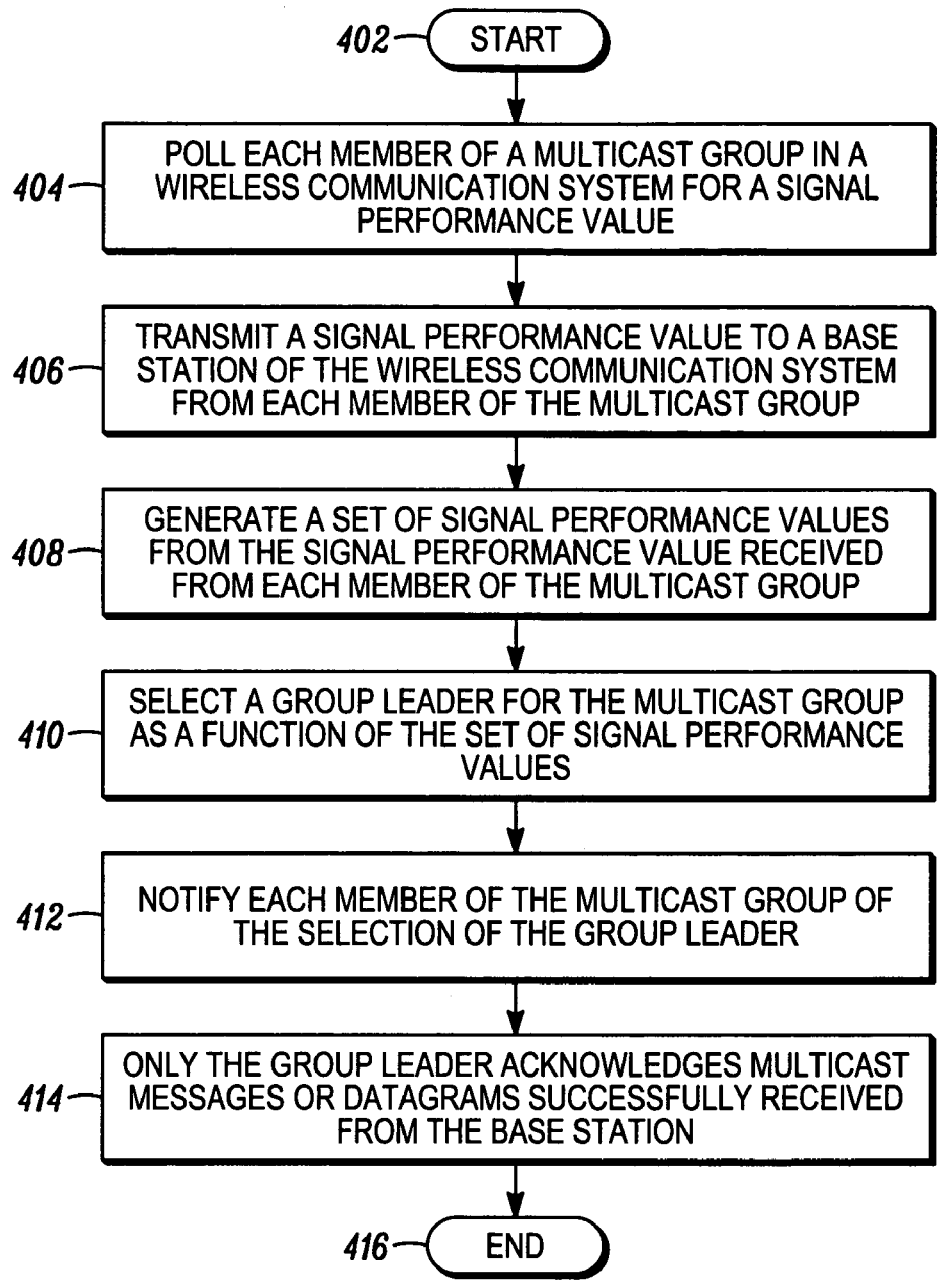
FIG. 4 illustrates a flow chart for a method of selecting a group leader according to the functional diagram of FIG. 3.

FIG. 4 illustrates a flow chart 400 for a method of selecting a group leader according to the functional diagram of FIG. 3.

Step 402 is the entry point of the flow chart 400.

In step 404, the base station polls each member of a multicast group in a wireless communication system for a signal quality estimate.

In step 406, each member of the multicast group transmits a signal quality estimate to a base station of the wireless communication system.

In step 408, the base station generates a set of signal performance values from the signal quality estimate received from each member of the multicast group.

In step 410, the base station selects a group leader for the multicast group as a function of the set of signal performance values. For example, the base station may select the member of the multicast group having the lowest signal performance value as the group leader. Alternatively, the base station may exclude members of the multicast group from being the group leader if they report a signal performance value that is less than a selected minimum threshold, anticipating that members of the multicast group that experience signal performance below the threshold value will soon change location to improve their reception. Once their signal performance improves, they can recover multicast messages or datagrams that were dropped in future re-transmissions from the base station.

In step 412, the base station notifies each member of the multicast group of the selection of the group leader. Each member of the multicast group that recognizes that it is not the group leader suspends acknowledgment and suspends requests for re-transmission of multicast transmissions from the base station. Alternatively, the base station may transmit a message to each member of the multicast group except the group leader to suspend acknowledgment and requests for re-transmission of multicast messages or datagrams from the base station.

In step 414, only the group leader acknowledges multicast messages or datagrams successfully received and requests re-transmission of messages or datagrams not successfully received from the base station. Multicast messages or datagrams that are re-transmitted by the base station at the request of the group leader may also be received by other members of the multicast group that did not successfully receive the same messages.

Step 416 is the exit point of the flow chart 400.

FIG. 5 illustrates a computer program 500 for the method of FIG. 3 that includes the group leader selection timer 204 in FIG. 2. In FIG. 5, the group leader selection timer 204 has a predetermined expiration period. While the group leader selection timer 204 is running, the base station 200 polls the members of the multicast group 110 and waits for the replies that include a signal quality estimate from each member of the multicast group 110. When the group leader selection timer 204 expires, the base station 200 notifies each member of the multicast group 110 of the selection of the group leader and ignores any late replies. The base station 200 starts the group leader selection timer 204 whenever it is desired to initiate the group leader selection procedure.

During multicast service, the message containing the group leader assignment or the notification that the group leader is leaving may be lost. The base station may also implement the group leader re-selection timer 206 in FIG. 2 to initiate a group leader selection procedure when the group leader fails to acknowledge a multicast message. The group leader re-selection timer 206 has a pre-determined expiration period. The group leader re-selection timer 206 may be reset, for example, upon expiration or upon receiving a message from the group leader such as an acknowledgement of a multicast message or a datagram received from the base station 200.

Figure 6:
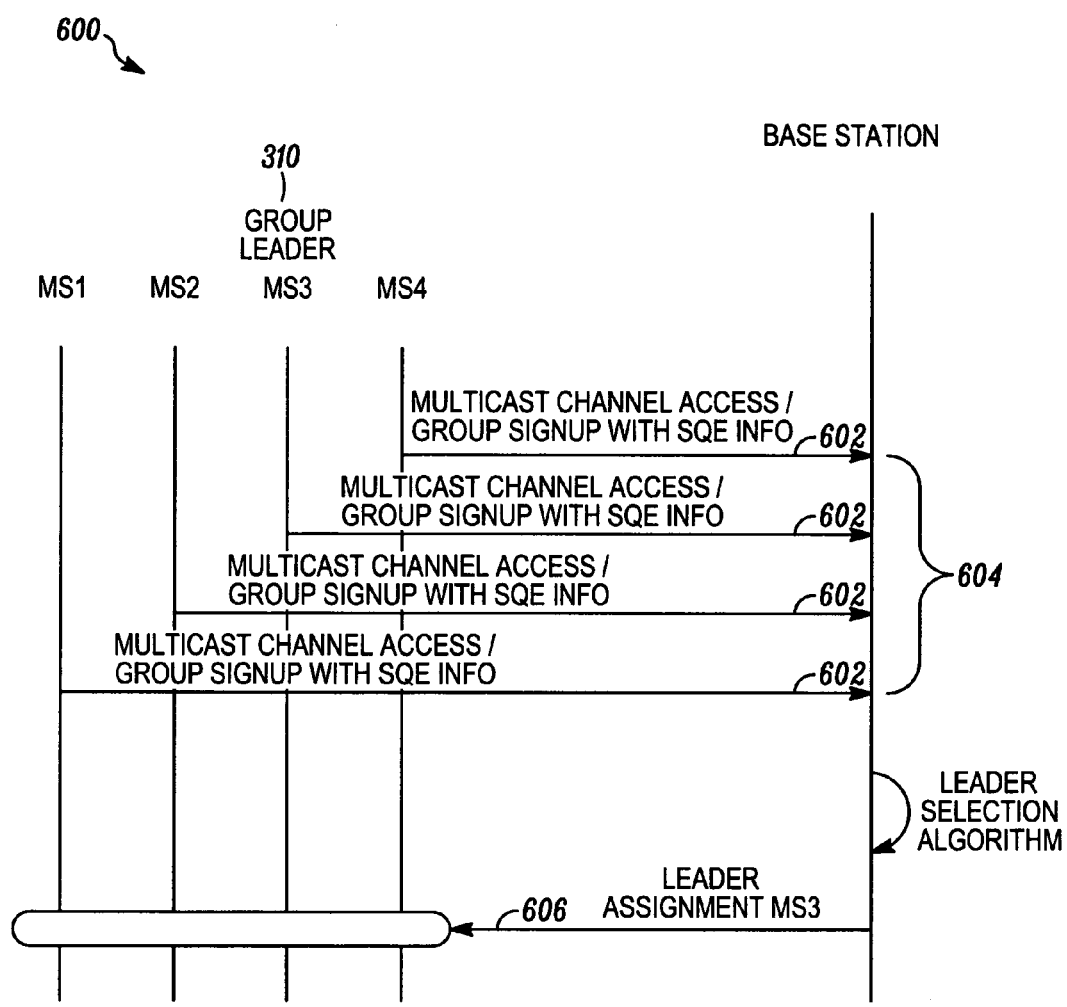
FIG. 6 illustrates a functional diagram of the group leader selection module of FIG. 2 in which a signal quality estimate is included in a multicast channel access/group signup message.

FIG. 6 illustrates a functional diagram 600 of the group leader selection management module 202 of FIG. 2 in which a signal quality estimate is included in a multicast channel access/group signup message. Shown in FIG. 6 are multicast channel access/group signup messages 602, a set of signal performance values 604, a group leader assignment message 606, and a group leader 310.

In FIG. 6, the initial polling of each member of the multicast group by the base station is not required, because the signal quality estimate (SQE) is included in the channel access message sent by each member of the multicast group 110 to the base station 200 when the multicast group 110 is established. The base station 200 receives the signal quality estimates in the multicast channel access/ group signup messages 602, generates the set of signal performance values 604, and selects the group leader 310 in the same manner as described above with reference to FIG. 3. The selection of the group leader 310 is communicated to each member of the multicast group via the group leader assignment message 606.

Figure 7:
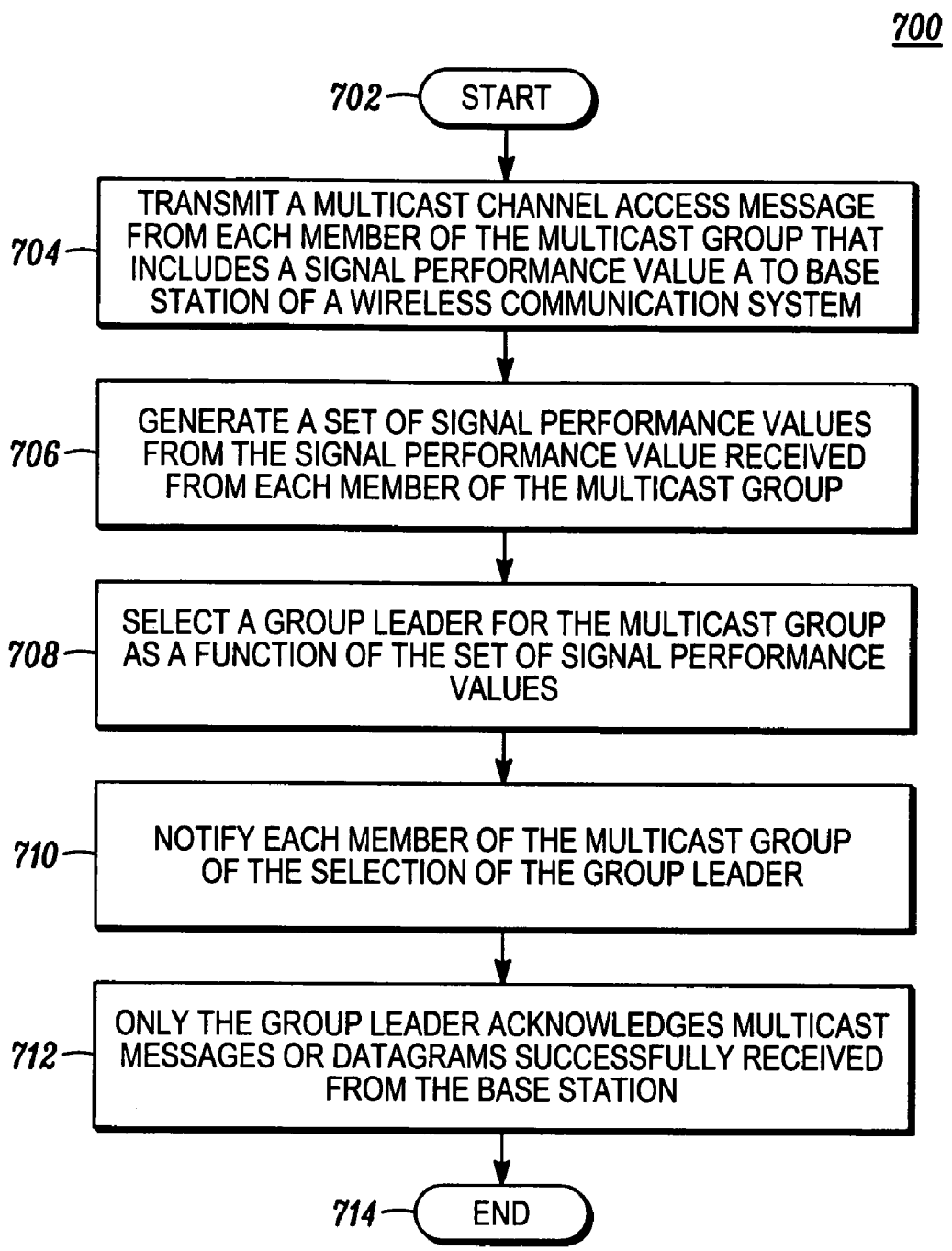
FIG. 7 illustrates a flow chart for a method of selecting a group leader according to the functional diagram of FIG. 6.

FIG. 7 illustrates a flow chart 700 for a method of selecting a group leader according to the functional diagram of FIG. 6.

Step 702 is the entry point of the flow chart 700.

In step 704, each member of the multicast group transmits a multicast channel access message that includes a signal quality estimate (SQE) to a base station of a wireless communication system. Including the signal quality estimate in the multicast channel access message advantageously avoids the necessity of having to transmit the signal quality estimate in a separate transmission.

In step 706, the base station receives the signal quality estimate from each member of the multicast group and generates a set of signal performance values. The set of signal performance values includes the signal quality estimate received from each member of the multicast group.

In step 708, the base station selects a group leader from the multicast group as a function of the set of signal performance values as described above with reference to FIG. 3.

In step 710, the base station notifies each member of the multicast group of the selection of the group leader. Each member of the multicast group that recognizes that it is not the group leader suspends acknowledgment and requests for re-transmission of subsequent multicast transmissions from the base station. Alternatively, the base station may transmit a message to each member of the multicast group except the group leader to suspend acknowledgment and requests for re-transmission of subsequent multicast messages or datagrams from the base station.

In step 712, only the group leader acknowledges multicast messages or datagrams successfully received and requests re-transmission of messages or datagrams not successfully received from the base station.

Step 714 is the exit point of the flow chart 700.

Figure 8:
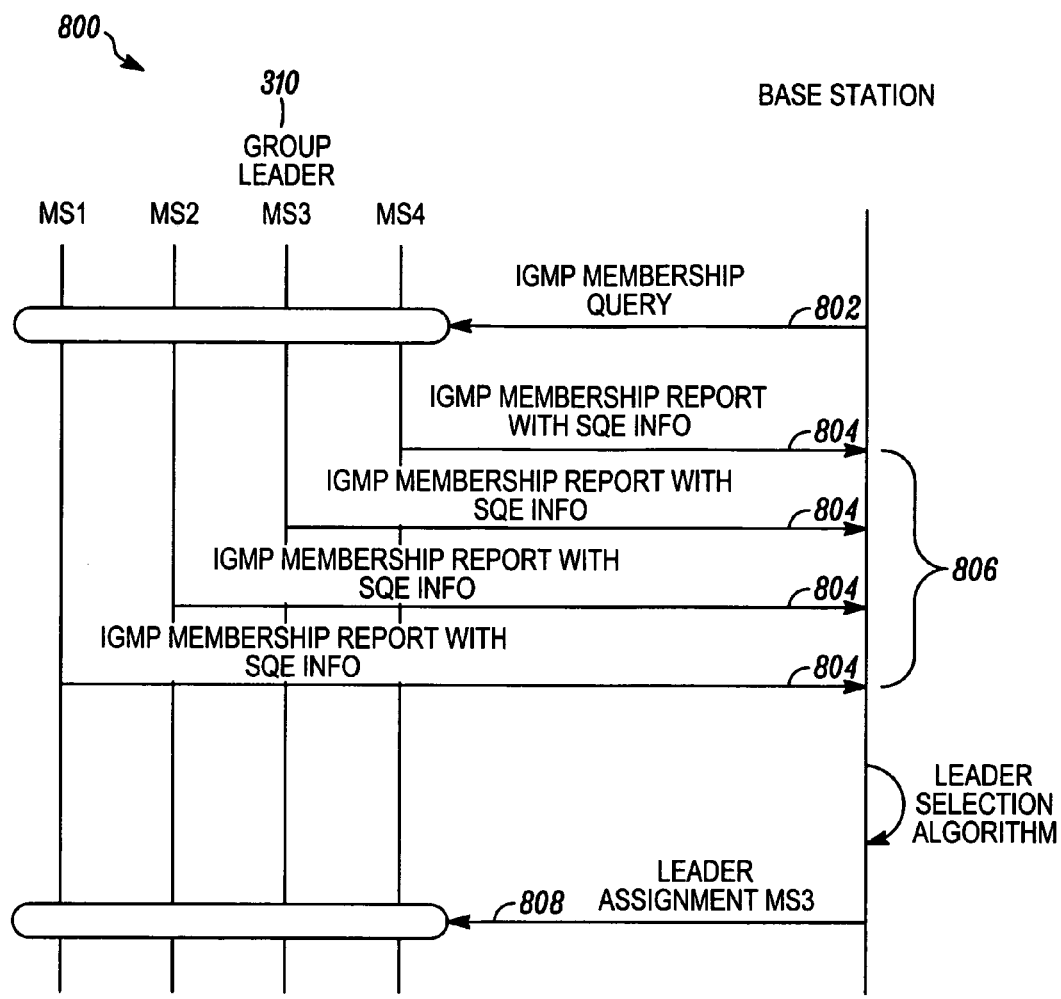
FIG. 8 illustrates a functional diagram of the group leader selection module of FIG. 2 in which a signal quality estimate is included in an IGMP membership report.

FIG. 8 illustrates a functional diagram 800 of the group leader selection module of FIG. 2 in which a signal quality estimate is included in an IGMP membership report. Shown in FIG. 8 are an Internet Group Management Protocol (IGMP) membership query 802, IGMP membership reports 804, a set of signal performance values 806, a group leader assignment message 808, and a group leader 310.

In FIG. 8, the signal quality estimate (SQE) is advantageously included in the IGMP membership reports 804 sent by each member of the multicast group to the base station when the multicast group is established in a telecommunication system that uses Internet Group Management Protocol (IGMP) between the mobile stations and the base station. By including the signal quality estimate information in the IGMP membership reports 804, no delay or bandwidth overhead is added to the telecommunication system, and no changes to existing wireless multicast protocol standards are required. The base station receives the signal quality estimates from the IGMP membership reports 804, generates the set of signal performance values 806, and selects the group leader 310 in the same manner as described above with reference to FIG. 3. The selection of the group leader 310 is communicated to each member of the multicast group via the group leader assignment message 808.

Figure 9:
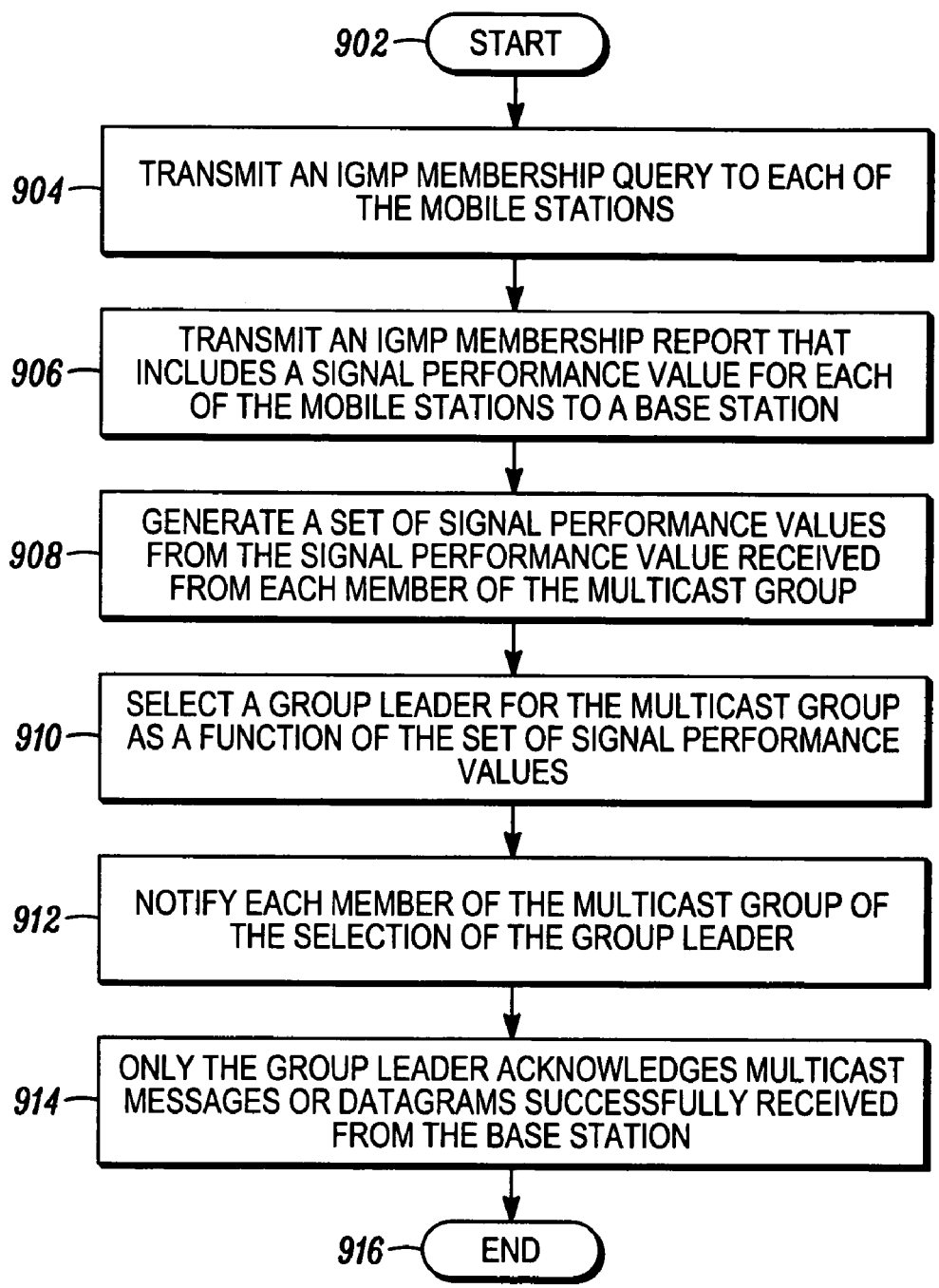
FIG. 9 illustrates a flow chart for a method of selecting a group leader according to the functional diagram of FIG. 8.

FIG. 9 illustrates a flow chart 900 for a method of selecting a group leader according to the functional diagram of FIG. 8.

Step 902 is the entry point of the flow chart 900.

In step 904, the base station initiates a multicast group setup by transmitting an IGMP membership query to each of the mobile stations.

In step 906, each member of the multicast group transmits an IGMP membership report that includes a signal quality estimate to a base station of the wireless communication system. Including the signal quality estimate for each of the mobile stations in the IGMP membership report advantageously avoids the necessity of having to transmit the signal quality estimate in a separate transmission.

In step 908, the base station receives the signal quality estimate received from each member of the multicast group and generates a set of signal performance values that includes the signal quality estimate received from each member of the multicast group.

In step 910, the base station selects a group leader from the multicast group as a function of the set of signal performance values in the same manner as described above with reference to FIG. 3.

In step 912, the base station notifies each member of the multicast group of the selection of the group leader. Each member of the multicast group that recognizes that it is not the group leader suspends acknowledgment and requests for re-transmission of subsequent multicast transmissions from the base station. Alternatively, the base station may transmit a message to each member of the multicast group except the group leader to suspend acknowledgment and requests for re-transmission of multicast messages or datagrams from the base station.

In step 914, only the group leader acknowledges subsequent multicast messages or datagrams successfully received from the base station and requests re-transmission of messages or datagrams that are not successfully received from the base station. Multicast messages or datagrams that are re-transmitted by the base station at the request of the group leader may also be received by other members of the multicast group that did not successfully receive the same messages.

Step 916 is the exit point of the flow chart 900.

After a group leader for the multicast group has been selected, there may arise conditions in which the group leader leaves the multicast group, for example, when moving to a different sector or cell or terminating its subscription to the multicast group. When the group leader leaves the multicast group, a new group leader may be selected as follows.

Figure 10:
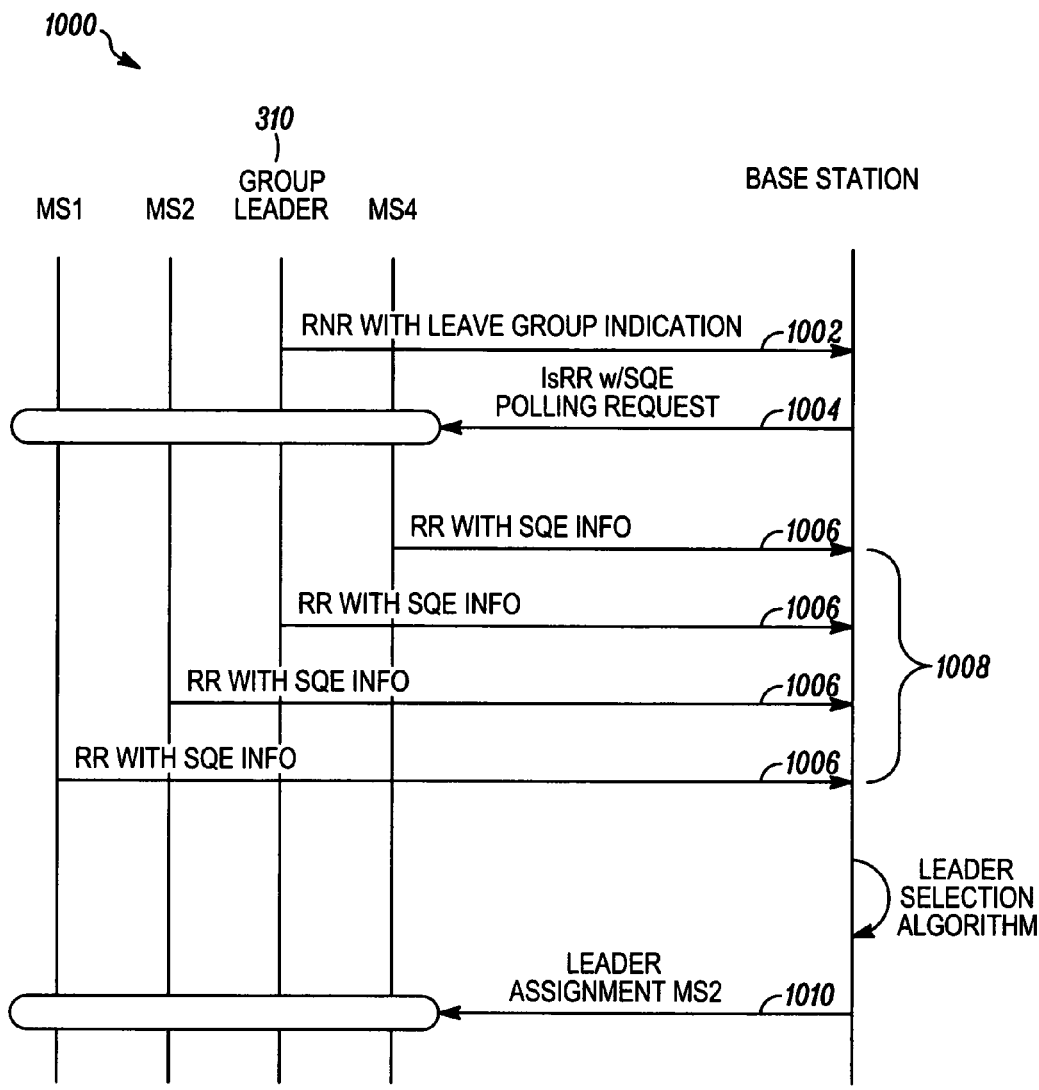
FIG. 10 illustrates a functional diagram of the group leader selection module of FIG. 2 in which the group leader leaves the multicast group.

FIG. 10 illustrates a functional diagram for the group leader selection module of FIG. 2 in which the group leader leaves the multicast group. Shown in FIG. 10 are a Receive Not Ready (RNR) message 1002, an Is Receive Ready (IsRR) polling request 1004, Receive Ready messages 1006, a set of signal performance values 1008, a group leader assignment message 1010, and a group leader 310.

In FIG. 10, the group leader 310 transmits the Receive Not Ready (RNR) message 1002 with a Leave Group Indication to inform the base station that the group leader 310 is leaving the multicast group. The base station sends the Is Receive Ready (IsRR) polling request 1004 to each member of the multicast group, and each of the mobile stations sends a Receive Ready message 1006 in response. In this embodiment, each of the Receive Ready messages 1006 includes the signal quality estimate (SQE). By including the signal quality estimate information in the Receive Ready messages 1006, no delay or bandwidth overhead is added to the telecommunication system, and the signal quality estimate may be embedded in messages from the mobile stations to the base station using existing wireless multicast protocol standards. The base station receives the signal quality estimates from the Receive Ready messages 1006, generates the set of signal performance values 1008, and selects the group leader 310 in the same manner as described above with reference to FIG. 3. The selection of the group leader 310 is communicated to each member of the multicast group via the group leader assignment message 1010.

Figure 11:
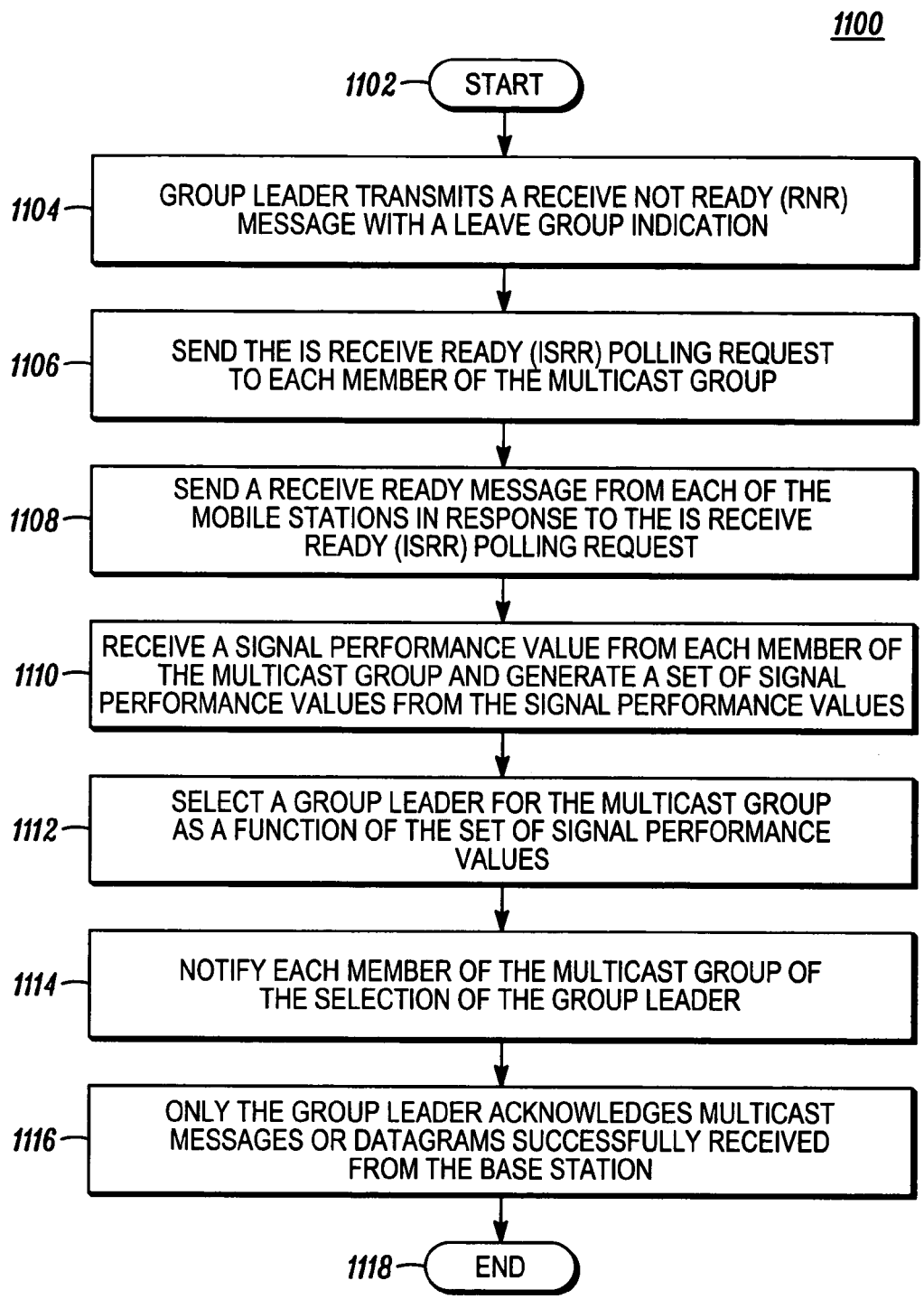
FIG. 11 illustrates a flow chart for a method of selecting a group leader according to the functional diagram of FIG. 10.

FIG. 11 illustrates a flow chart 1100 for a method of selecting a group leader according to the functional diagram of FIG. 10.

Step 1102 is the entry point of the flow chart 1100.

In step 1104, the group leader transmits a Receive Not Ready (RNR) message with a Leave Group Indication to inform the base station that the group leader 310 is leaving the multicast group.

In step 1106, the base station sends the Is Receive Ready (IsRR) polling request to each member of the multicast group.

In step 1108, each of the mobile stations sends a Receive Ready message in response to the Is Receive Ready (IsRR) polling request. In this embodiment, the Receive Ready messages include the signal quality estimate for each of the mobile stations in the multicast group.

In step 1110, the base station receives the signal quality estimate from each member of the multicast group and generates a set of signal performance values from the signal quality estimates.

In step 1112, the base station selects a group leader from the multicast group as a function of the set of signal performance values in the same manner as described above with reference to FIG. 3.

In step 1114, the base station notifies each member of the multicast group of the selection of the group leader. Each member of the multicast group that recognizes that it is not the group leader suspends acknowledgment of subsequent multicast transmissions from the base station. Alternatively, the base station may transmit a message to each member of the multicast group except the group leader to suspend acknowledgment and requests for re-transmission of subsequent multicast messages or datagrams from the base station.

In step 1116, only the group leader acknowledges subsequent multicast messages or datagrams successfully received from the base station and requests re-transmission of messages or datagrams that are not successfully received from the base station. Multicast messages or datagrams that are re-transmitted by the base station at the request of the group leader may also be received by other members of the multicast group that did not successfully receive the same messages.

Step 1118 is the exit point of the flow chart 1100.

After the group leader is selected, a member of the multicast group other than the group leader may experience a substantial change in signal performance. As a result, the signal performance of the multicast group may be affected. For example, if the signal quality estimate of the group leader improves, the group leader will request fewer requests for re-transmission to the base station. As a result, other members of the multicast group that have poorer signal performance may not recover lost messages or datagrams. On the other hand, if the signal quality estimate of a member of the multicast group other than the group leader worsens, then a new group leader may be needed that more accurately represents the signal performance of all the members of the multicast group.

Figure 12:
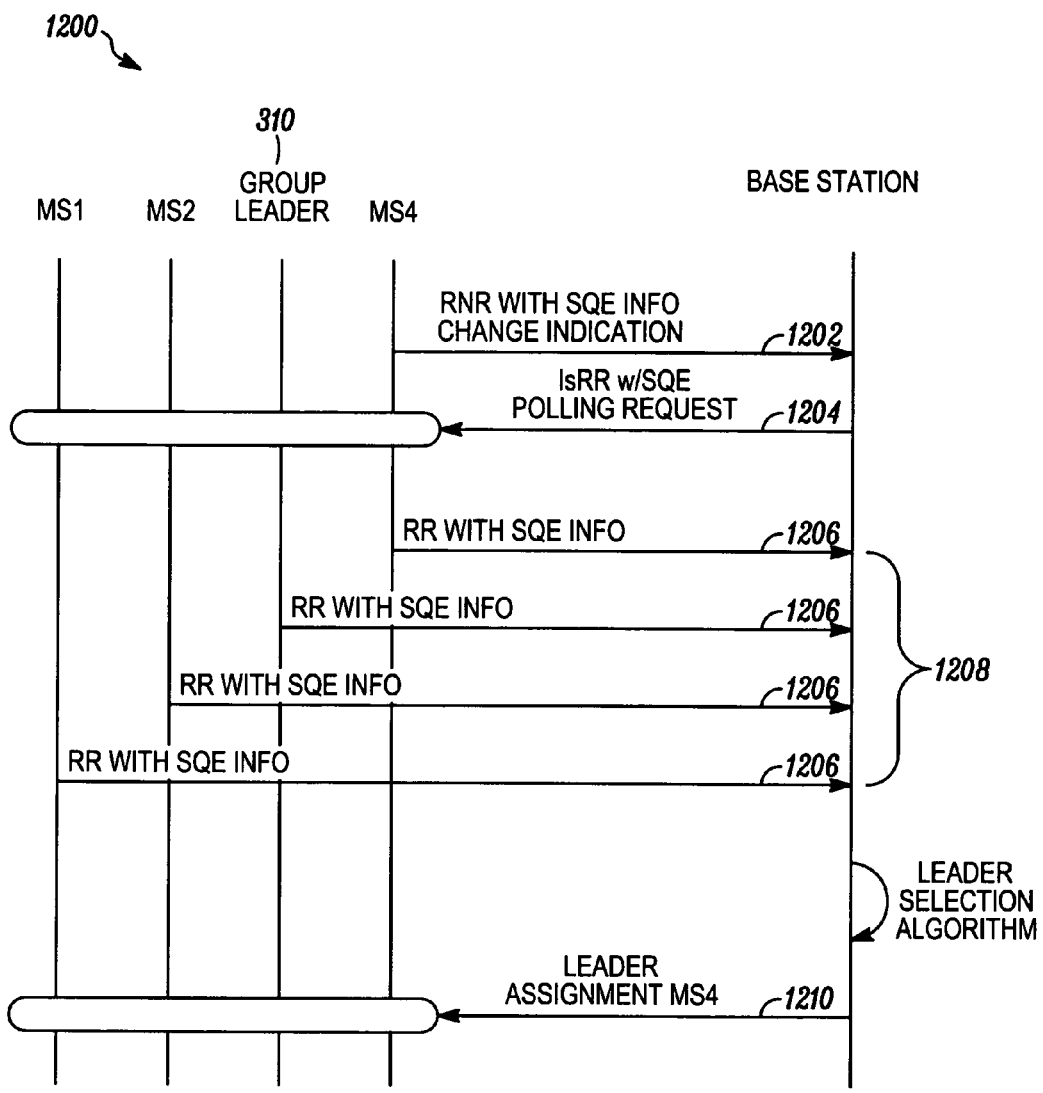
FIG. 12 illustrates a functional diagram of the group leader selection module of FIG. 2 in which a member of the multicast group experiences a change in signal performance.

FIG. 12 illustrates a functional diagram 1200 for the group leader selection module of FIG. 2 in which a member of the multicast group experiences a change in signal performance. Shown in FIG. 12 are a Receive Not Ready (RNR) message 1202, an Is Receive Ready (IsRR) polling request 1204, Receive Ready messages 1206, a set of signal performance values 1208, a group leader assignment message 1210, and a group leader 310.

In FIG. 12, the member of the multicast group that experiences a change in signal performance that exceeds a selected threshold transmits the Receive Not Ready (RNR) message 1202 that includes the new signal quality estimate to the base station. For example, the signal performance of the group leader may improve by more than an upper limit of the threshold, or the signal performance of another member of the multicast group other than the group leader may worsen by more than a lower limit of the selected threshold. As an example, the threshold may have an upper limit of +4 decibels and a lower limit of −3 decibels. The base station sends the Is Receive Ready (IsRR) polling request 1204 to each member of the multicast group, and each of the mobile stations sends a Receive Ready message 1206 in response. In this embodiment, each of the Receive Ready messages 1006 includes the signal quality estimate (SQE), although other signal performance parameters may be used instead of or in addition to the signal quality estimate to practice various embodiments to suit specific applications. By including the signal quality estimate information in the Receive Ready messages 1006, no delay or bandwidth overhead is added to the telecommunication system, and the signal quality estimate may be embedded in messages from the mobile stations to the base station using existing wireless multicast protocol standards. The base station receives the signal quality estimates from the Receive Ready messages 1206, generates the set of signal performance values 1208, and selects the group leader 310 in the same manner as described above with reference to FIG. 3. The selection of the group leader 310 is communicated to each member of the multicast group via the group leader assignment message 1210.

Figure 13:
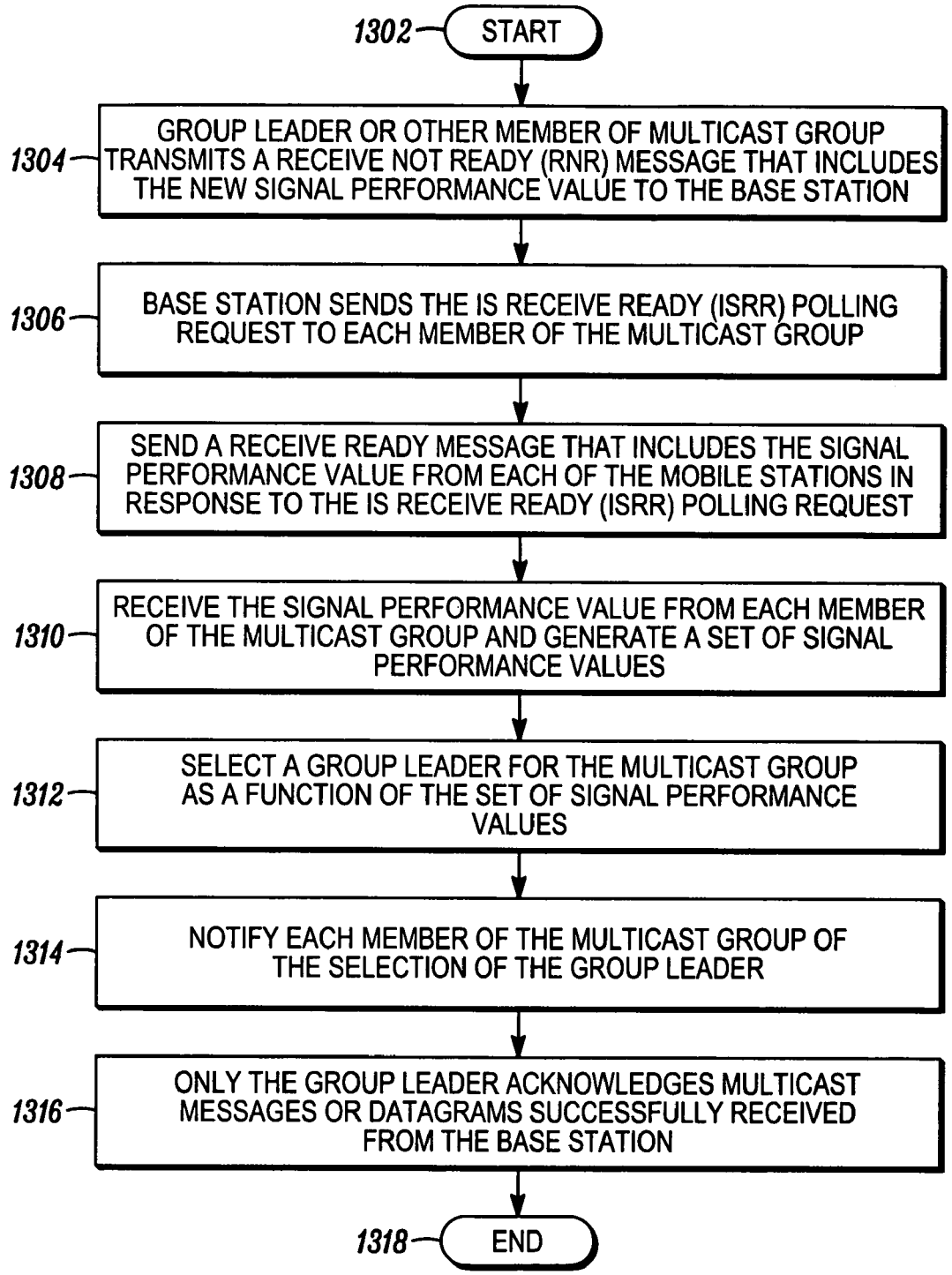
FIG. 13 illustrates a flow chart for a method of selecting a group leader according to the functional diagram of FIG. 12.

FIG. 13 illustrates a flow chart 1300 for a method of selecting a group leader according to the functional diagram of FIG. 12.

Step 1302 is the entry point of the flow chart 1300.

In step 1304, any member of the multicast group, including the group leader, that experiences a change in signal performance above an upper limit or below a lower limit of a selected threshold transmits a Receive Not Ready (RNR) message that includes the new signal quality estimate to the base station.

In step 1306, the base station sends an Is Receive Ready (IsRR) polling request to each member of the multicast group.

In step 1308, each of the mobile stations sends a Receive Ready message in response to the Is Receive Ready (IsRR) polling request. In this embodiment, the Receive Ready messages include the signal quality estimate for each of the mobile stations in the multicast group.

In step 1310, the base station receives the signal quality estimate from each member of the multicast group and generates a set of signal performance values from the signal quality estimates.

In step 1312, the base station selects a group leader from the multicast group as a function of the set of signal performance values in the same manner as described above with reference to FIG. 3.

In step 1314, the base station notifies each member of the multicast group of the selection of the group leader. Each member of the multicast group that recognizes that it is not the group leader suspends acknowledgment of subsequent multicast transmissions from the base station. Alternatively, the base station may transmit a message to each member of the multicast group except the group leader to suspend acknowledgment and requests for re-transmission of subsequent multicast messages or datagrams from the base station.

In step 1316, only the group leader acknowledges subsequent multicast messages or datagrams successfully received from the base station and requests re-transmission of messages or datagrams that are not successfully received from the base station. Other members of the multicast group that did not successfully receive the same multicast messages or datagrams may receive them when they are re-transmitted by the base station at the request of the group leader.

Step 1318 is the exit point of the flow chart 1300.

In another embodiment, the base station may initiate the selection of a group leader when the number or percentage of re-transmitted messages or datagrams exceeds an upper limit or falls below a lower limit of a selected threshold as follows.

Figure 14:
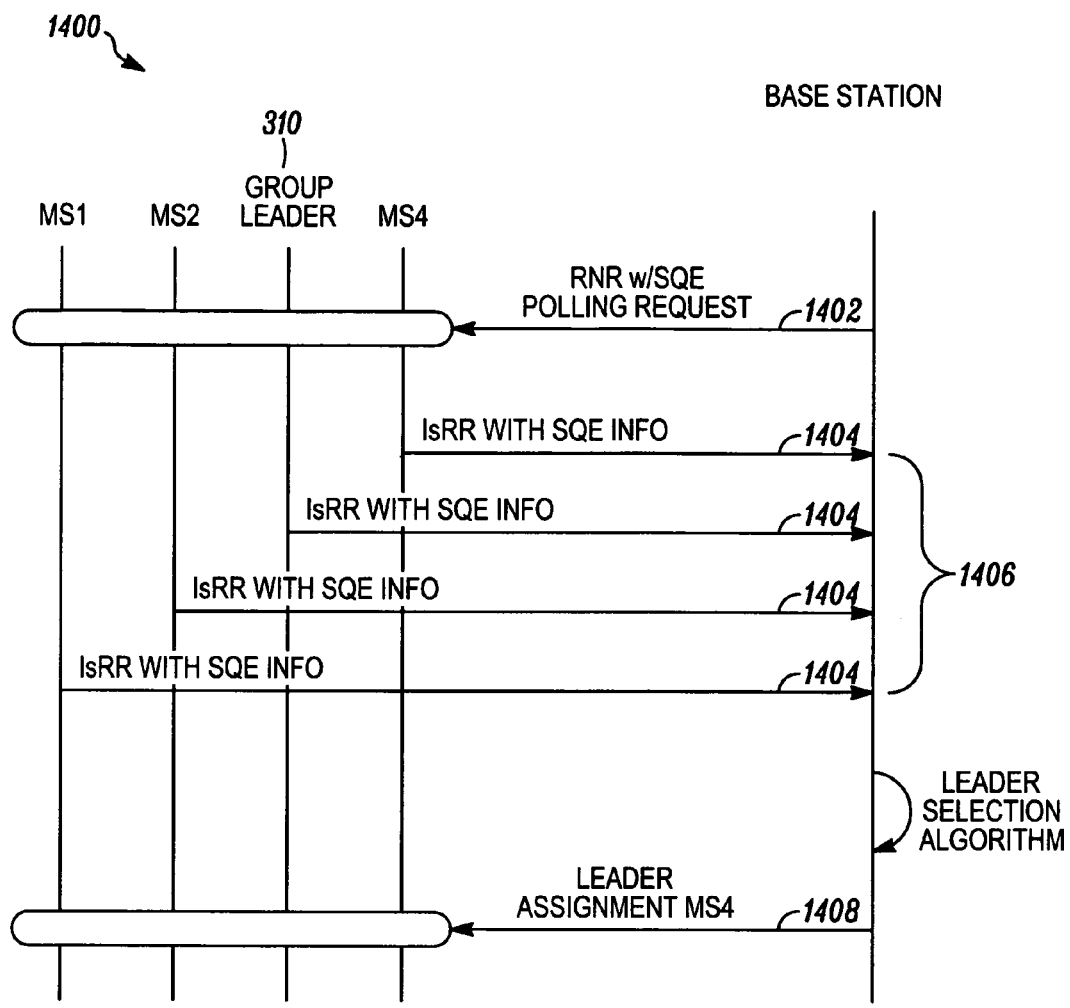
FIG. 14 illustrates a functional diagram of the group leader selection module of FIG. 2 in which the base station initiates the selection of a group leader.

FIG. 14 illustrates a functional diagram 1400 for the group leader selection module of FIG. 2 in which the base station initiates the selection of a group leader. Shown in FIG. 14 are a Receive Not Ready (RNR) polling request 1402, Is Receive Ready (IsRR) messages 1404, a set of signal performance values 1406, a group leader assignment message 1408, and a group leader 310.

In FIG. 14, the base station transmits the Receive Not Ready (RNR) polling request 1402 to each member of the multicast group when the number of re-transmitted messages or datagrams exceeds an upper limit or falls below a lower limit of a selected threshold. For example, if the number of re-transmitted messages or datagrams exceeds the upper limit of the threshold, a new group leader may be selected that has better signal performance. On the other hand, if the number of re-transmitted messages or datagrams falls below the lower limit of the threshold, a new group leader may be selected that has poorer signal performance. The base station receives the Is Receive Ready (IsRR) messages 1404 from the mobile stations in response to the Receive Not Ready (RNR) polling request 1402. In this embodiment, the Is Receive Ready (IsRR) messages 1404 include the signal quality estimate. By including the signal quality estimate information in the Is Receive Ready messages 1404, no delay or bandwidth overhead is added to the telecommunication system, and the signal quality estimate may be embedded in messages from the mobile stations to the base station using existing multicast protocol standards, for example, the IGMP membership query message and IGMP membership reply message in IGMP protocol. The base station retrieves the signal quality estimates from the Is Receive Ready messages 1404, generates the set of signal performance values 1406, and selects the group leader 310 in the same manner as described above with reference to FIG. 3. The selection of the group leader 310 is communicated to each member of the multicast group via the group leader assignment message 1408.

Figure 15:
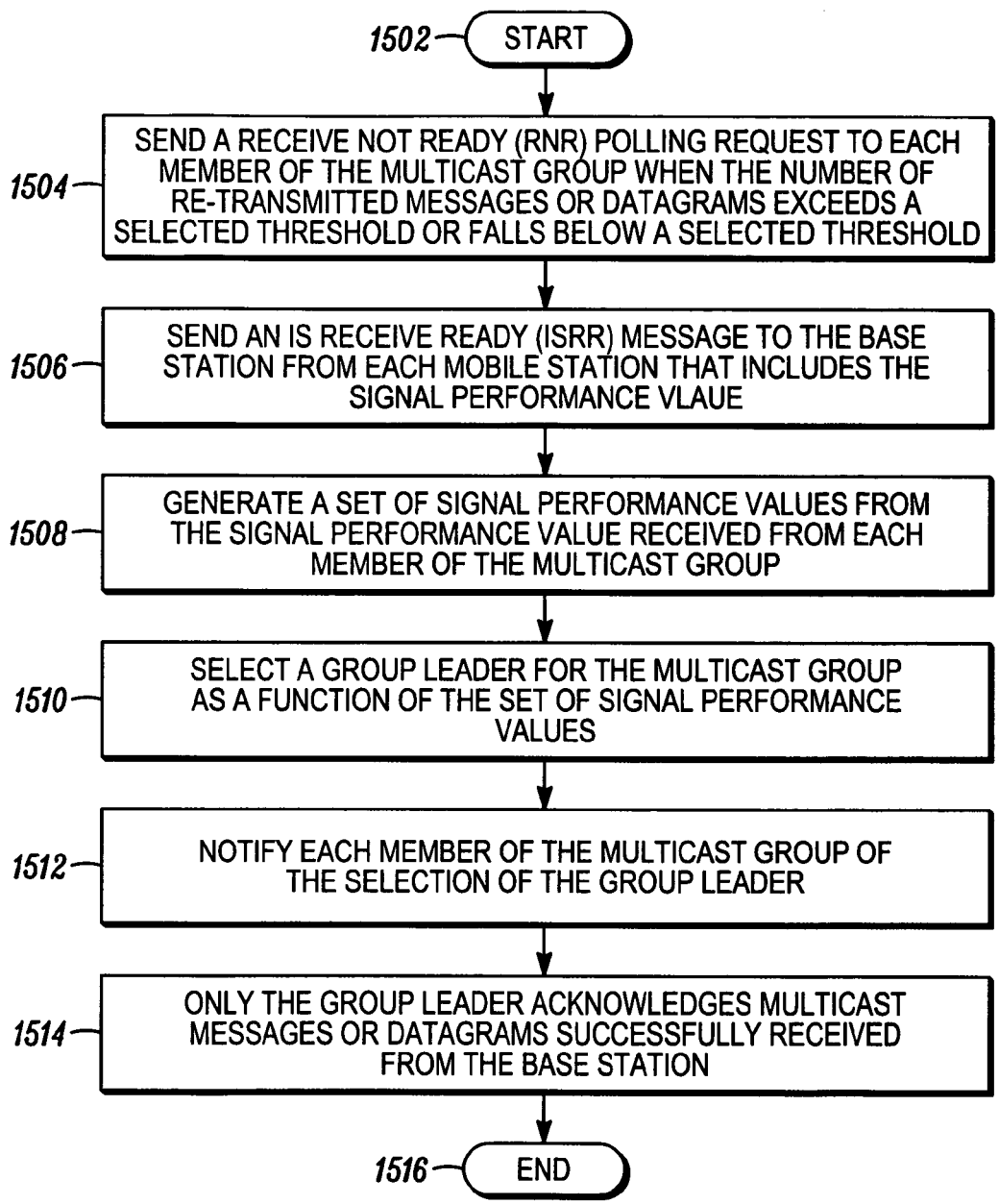
FIG. 15 illustrates a flow chart for a method of selecting a group leader according to the functional diagram of FIG. 14.

FIG. 15 illustrates a flow chart 1500 for a method of selecting a group leader according to the functional diagram of FIG. 14.

Step 1502 is the entry point of the flow chart 1500.

In step 1504, the base station sends a Receive Not Ready (RNR) polling request to each member of the multicast group, including the group leader, when the number or percentage of re-transmitted messages or datagrams exceeds an upper limit or falls below a lower limit of a selected threshold.

In step 1506, each member of the multicast group sends an Is Receive Ready (IsRR) message to the base station. In this embodiment, the Is Receive Ready messages include the signal quality estimate for each of the mobile stations in the multicast group.

In step 1508, the base station receives the signal quality estimate from each member of the multicast group and generates a set of signal performance values from the signal quality estimates.

In step 1510, the base station selects a group leader from the multicast group as a function of the set of signal performance values in the same manner as described above with reference to FIG. 3.

In step 1512, the base station notifies each member of the multicast group of the selection of the group leader. Each member of the multicast group that recognizes that it is not the group leader suspends acknowledgment of subsequent multicast transmissions from the base station. Alternatively, the base station may transmit a message to each member of the multicast group except the group leader to suspend acknowledgment and requests for re-transmission of subsequent multicast messages or datagrams from the base station.

In step 1514, only the group leader acknowledges subsequent multicast messages or datagrams successfully received from the base station and requests re-transmission of messages or datagrams that are not successfully received from the base station. Multicast messages or datagrams that are re-transmitted by the base station at the request of the group leader may also be received by other members of the multicast group that did not successfully receive the same messages.

Step 1516 is the exit point of the flow chart 1500.

FIG. 16 illustrates a computer program for the method of FIG. 3 for selecting the group leader when the signal performance value is based on the missed packet percentage experienced by each group member. FIG. 16 is identical to FIG. 5, except that a missed packet percentage is used instead of a signal quality estimate as the signal performance parameter. The percentage of missed packets is calculated by multiplying 100 times the number of missed multicast messages or datagrams and dividing by the total number of multicast messages or datagrams. For example, if 15 datagrams were dropped out of a total of 150 datagrams, then the percentage of missed packets would be 100×15/150=10 percent.

Figure 17:
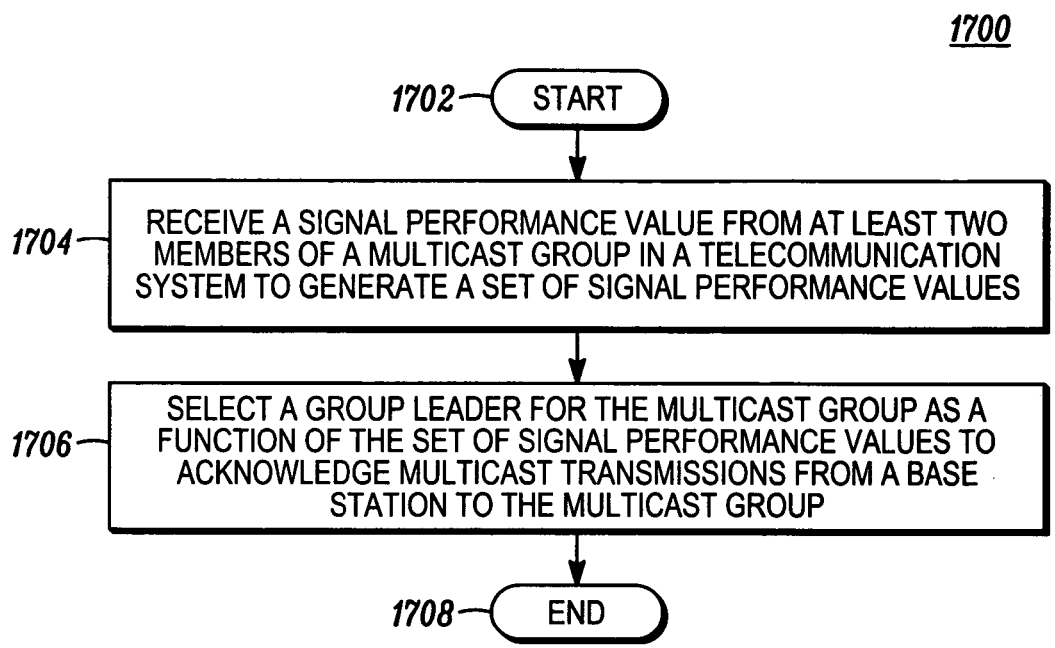
FIG. 17 illustrates a flow chart summarizing a method of selecting a group leader in a communication system as a function of signal performance.

FIG. 17 illustrates a flow chart summarizing a method of selecting a group leader in a communication system as a function of signal performance.

Step 1702 is the entry point of the flow chart 1700.

In step 1704, a signal performance value is received from at least two members of a multicast group in a telecommunication system to generate a set of signal performance values.

In step 1706, a group leader for the multicast group is selected as a function of the set of signal performance values to acknowledge multicast transmissions from a base station in the telecommunication system to the multicast group.

Step 1708 is the exit point of the flow chart 1700.

In another embodiment, a computer program product includes a medium for embodying a computer program for input to a computer and a computer program embodied in the medium for causing the computer to perform steps of:
  receiving a signal performance value from at least two members of the multicast group to generate a set of signal performance values; and
  selecting a group leader for the multicast group as a function of the set of signal performance values to acknowledge multicast transmissions from a base station to the multicast group.

Although the flowchart descriptions above are described and shown with reference to specific steps performed in a specific order, these steps may be combined, sub-divided, or reordered without departing from the scope of the claims. Unless specifically indicated, the order and grouping of steps is not a limitation of other embodiments that may lie within the scope of the claims.

As may be appreciated from the above, selecting a group leader for a multicast group as a function of a signal performance value can achieve a significant improvement in performance for protocols that require the automatic repeat request (ARQ) function.

The specific embodiments and applications thereof described above are for illustrative purposes only and do not preclude modifications and variations that may be made within the scope of the following claims.

What is claimed is:

1. A method of selecting a group leader for a multicast group, the method comprising the steps of:
  (a) receiving, by a base station, a signal performance value from at least two members of the multicast group to generate a set of signal performance values; and
  (b) selecting the group leader as a function of the set of signal performance values to acknowledge subsequent multicast messages or datagrams successfully received from the base station and to request re-transmission of messages or datagrams that are not successfully received from the base station;

wherein the group leader selected is the multicast group member that has an intermediate signal performance value between the lowest and the highest, in order to avoid a threshold number of re-transmissions.

2. The method of claim 1 wherein the signal performance value comprises at least one of a signal quality estimate, outbound received power, a received signal strength indicator, a missed packet percentage, and a successfully received packet percentage.

3. The method of claim 1 wherein step (a) comprises polling at least one member of the multicast group for the signal performance value.

4. The method of claim 1 wherein step (a) comprises including the signal performance value in a multicast channel access/group signup message.

5. The method of claim 1 wherein step (a) comprises including the signal performance value in an Internet Group Management Protocol membership report.

6. The method of claim 1 wherein step (a) comprises including the signal performance value in a Receive Ready message.

7. The method of claim 1 further comprising repeating step (b) when the group leader leaves the multicast group.

8. The method of claim 1 further comprising repeating step (b) when the signal performance value of a member of the multicast group other than the group leader worsens by more than a selected threshold.

9. The method of claim 1 further comprising repeating step (b) when the signal performance value of the group leader of the multicast group improves by more than a selected threshold.

10. The method of claim 1 wherein step (a) comprises including the signal performance value request in an Is Receive Ready message.

11. A base station for a telecommunication system, the base station comprising:

a set of signal performance values generated from a signal performance value received from each of at least two members of a multicast group; and a group leader selection management module for selecting a group leader for the multicast group as a function of the set of signal performance values to acknowledge subsequent multicast messages or datagrams successfully receive from a base station and to request re-transmission of messages or datagrams that are not successfully received from the base station;

wherein the group leader selected is the multicast group member that has an intermediate signal performance value between the lowest and the highest, in order to avoid a threshold number of re-transmissions.

12. The base station of claim 11 wherein the signal performance value comprises at least one of a signal quality estimate, outbound received power, a received signal strength indicator, a missed packet percentage, and a successfully received packet percentage.

13. The base station of claim 12 wherein the group leader selection management module polls at least one member of the multicast group for the signal performance value.

14. The base station of claim 12 wherein the group leader selection management module receives the signal performance value in a multicast channel access/group signup message.

15. The base station of claim 12 wherein the signal performance value is included in an Internet Group Management Protocol membership report.

16. The base station of claim 12 wherein the signal performance value is included in one of a Receive Ready message and an Is Receive Ready request message.

17. The base station of claim 11 further comprising a new set of signal performance values for replacing the group leader of the multicast group as a function of the new set of signal performance values when the group leader leaves the multicast group.

18. The base station of claim 11 further comprising a new set of signal performance values for replacing the group leader of the multicast group as a function of the new set of signal performance values when the signal performance value of a member of the multicast group other than the group leader worsens by more than a selected threshold.

19. The base station of claim 11 further comprising a new set of signal performance values for replacing the group leader of the multicast group as a function of the new set of signal performance values when the signal performance value of the group leader of the multicast group improves by more than a selected threshold.

20. The base station of claim 11 further comprising a unicast message sent from the base station to each member of the multicast group except the group leader to suspend acknowledgment of multicast transmissions from the base station to the multicast group.

21. The base station of claim 11 further comprising a group leader selection timer to initiate a group leader selection procedure.

22. The base station of claim 11 further comprising a group leader re-selection timer to initiate a group leader selection procedure when the group leader fails to acknowledge a multicast message.

* * * * *